United States Patent
D'Souza (10) Patent No.: US 10,691,214 B2
(45) Date of Patent: Jun. 23, 2020

(54) GESTURE CONTROL OF BUILDING AUTOMATION SYSTEM COMPONENTS DURING INSTALLATION AND/OR MAINTENANCE

(71) Applicant: Honeywell International Inc., Morristown, NJ (US)

(72) Inventor: Aaron D'Souza, Bangalore (IN)

(73) Assignee: Honeywell International Inc., Morris Plains, NJ (US)

(*) Notice: Subject to any disclaimer, the term of this patent is extended or adjusted under 35 U.S.C. 154(b) by 405 days.

(21) Appl. No.: 14/880,635

(22) Filed: Oct. 12, 2015

(65) Prior Publication Data

US 2017/0102773 A1    Apr. 13, 2017

(51) Int. Cl.
  *G05B 15/02*    (2006.01)
  *G06F 3/01*     (2006.01)
  (Continued)

(52) U.S. Cl.
  CPC .............. *G06F 3/017* (2013.01); *F24F 11/30* (2018.01); *G05B 15/02* (2013.01); *G06F 1/163* (2013.01);
  (Continued)

(58) Field of Classification Search
  CPC ...... G06F 3/017; G06F 1/163; G06F 3/04817; G06F 3/167; G06F 3/16; G06F 3/04883;
  (Continued)

(56) References Cited

U.S. PATENT DOCUMENTS 5,341,988 A * 8/1994 Rein ................. F24F 11/00
                                                      236/49.3
7,444,001 B2   10/2008 Roberts et al.
(Continued)

FOREIGN PATENT DOCUMENTS

CN         103472796       12/2013
EP           2876907 A1     5/2015
(Continued)

OTHER PUBLICATIONS

Bhuiyan et al., "Gesture-Controlled User Interfaces, What Have We Done and What's Next?" 10 pages, Center for Applied Internet Research, downloaded Mar. 7, 2016.
(Continued)

*Primary Examiner* — Lunyi Lao
*Assistant Examiner* — Jarurat Suteerawongsa
(74) *Attorney, Agent, or Firm* — Seager, Tufte & Wickhem, LLP (57) ABSTRACT

An HVAC component may be configured using a wearable device and a mobile device that is operatively coupled to the wearable device. The wearable device may be configured to capture one or more gestures that correspond to a particular HVAC component command, and to communicate the captured gestures to the mobile device. In response, the mobile device may carry out the HVAC component command that corresponds to the captured gesture. In this way, an installer may configure the HVAC component while lessening the need to directly enter commands into the mobile device and/or some other device.

16 Claims, 7 Drawing Sheets

(51) Int. Cl.
*G06F 1/16* (2006.01)
*G06F 3/16* (2006.01)
*G06F 3/0481* (2013.01)
*F24F 11/30* (2018.01)
*G08C 17/02* (2006.01)
*F24F 110/00* (2018.01)

(52) U.S. Cl.
CPC .......... *G06F 3/04817* (2013.01); *G06F 3/167* (2013.01); *G08C 17/02* (2013.01); *F24F 2110/00* (2018.01); *G08C 2201/32* (2013.01); *G08C 2201/50* (2013.01); *G08C 2201/93* (2013.01)

(58) Field of Classification Search
CPC ...... G06F 3/044; G06F 3/0488; F24F 11/001; G05B 15/02; A41D 1/002; A41D 31/00; D03D 1/0088; D10B 2401/16; D10B 2401/18
See application file for complete search history.

(56) References Cited

U.S. PATENT DOCUMENTS

| | | | |
|---|---|---|---|
| 7,834,847 B2 | 11/2010 | Boillot et al. | |
| 7,924,164 B1 | 4/2011 | Staerzl | |
| 8,106,749 B2 | 1/2012 | Ina et al. | |
| 8,194,925 B2 | 6/2012 | Higgins | |
| 8,195,585 B1 | 6/2012 | Tu et al. | |
| 8,407,625 B2 | 3/2013 | Cohen et al. | |
| 8,457,353 B2 | 6/2013 | Reville et al. | |
| 9,000,887 B2 | 4/2015 | Linsky et al. | |
| 9,129,154 B2 | 9/2015 | Kim et al. | |
| 9,430,044 B2 | 8/2016 | Jain et al. | |
| 2004/0193413 A1 | 9/2004 | Wilson et al. | |
| 2004/0249597 A1* | 12/2004 | Whitehead | G05B 19/042 702/118 |
| 2006/0187196 A1 | 8/2006 | Underkoffler et al. | |
| 2006/0256082 A1 | 11/2006 | Cho et al. | |
| 2007/0115355 A1 | 5/2007 | McCormack | |
| 2007/0130547 A1 | 6/2007 | Boillot | |
| 2007/0259716 A1* | 11/2007 | Mattice | G06F 3/013 463/36 |
| 2008/0238665 A1 | 10/2008 | Peng | |
| 2009/0271004 A1 | 10/2009 | Zecchin et al. | |
| 2010/0066676 A1 | 3/2010 | Kramer et al. | |
| 2010/0083373 A1 | 4/2010 | White et al. | |
| 2010/0205667 A1 | 8/2010 | Anderson et al. | |
| 2010/0302165 A1 | 12/2010 | Li | |
| 2010/0321289 A1 | 12/2010 | Kim et al. | |
| 2011/0001957 A1 | 1/2011 | Braune et al. | |
| 2011/0032145 A1 | 2/2011 | Hansen et al. | |
| 2011/0173204 A1 | 7/2011 | Murillo et al. | |
| 2011/0304541 A1 | 12/2011 | Dalai | |
| 2012/0095575 A1 | 4/2012 | Meinherz et al. | |
| 2012/0127306 A1 | 5/2012 | Oh et al. | |
| 2012/0242850 A1 | 9/2012 | Laberge et al. | |
| 2012/0306736 A1 | 12/2012 | Thiruvengada et al. | |
| 2012/0307052 A1 | 12/2012 | Thiruvengada et al. | |
| 2013/0190089 A1 | 7/2013 | Wilson et al. | |
| 2013/0204408 A1 | 8/2013 | Thiruvengada et al. | |
| 2013/0232145 A1 | 9/2013 | Weissman et al. | |
| 2014/0040835 A1 | 2/2014 | Hildreth et al. | |
| 2014/0143785 A1 | 5/2014 | Mistry et al. | |
| 2014/0157013 A1 | 6/2014 | El Assawy et al. | |
| 2014/0267008 A1 | 9/2014 | Jain et al. | |
| 2014/0319232 A1* | 10/2014 | Gourlay | G05D 23/1905 236/51 |
| 2015/0053781 A1* | 2/2015 | Nelson | F24F 11/30 236/1 C |
| 2015/0106770 A1 | 4/2015 | Shah et al. | |
| 2015/0141076 A1 | 5/2015 | Libin et al. | |
| 2015/0143601 A1* | 5/2015 | Longinotti-Buitoni | A61B 5/0002 2/69 |
| 2016/0054023 A1* | 2/2016 | Baker | E04F 19/00 307/31 |
| 2016/0224036 A1* | 8/2016 | Baker | G05D 23/1393 |
| 2016/0283101 A1* | 9/2016 | Schwesig | A41D 1/002 |

FOREIGN PATENT DOCUMENTS

| | | |
|---|---|---|
| WO | 2013067526 A1 | 5/2013 |
| WO | WO 2015/039178 | 3/2015 |

OTHER PUBLICATIONS

Bonino et al., "dWatch: a Personal Wrist Watch for Smart Environments," Politecnico di Torino Dipartimento di Automatica di Informatica, 8 pages, Jun. 4, 2012.
http://developer.android.com/guide/topics/ sensors/ sensors_motion. html, "Motion Sensors," Android Developer, 10 pages, printed Sep. 11, 2015.
Kim et al., "An Intelligent Smart Home Control Using Body Gestures," IEEE Proceeding of the 2006 Conference on International Hybrid Information Technology, 11 pages, 2006.
Krum et al., "Speech and Gesture Multimodal Control of a Whole Earth 3D Visualization Environment," College of Computing, Georgia Institute of Technology, 6 pages, 2002.
Ng et al., "Gesture Based Automating Household Appliances," Human-Computer Interaction, 14th International Conference, HCI International Proceedings Part II, 11 pages, Jul. 2011.
Ruiz, "Motion Gestures for Mobile Interaction," downloaded from https://www.jaimeruiz.com/research!projects/motion-gestures-for-mobile-interaction/, 4 pages, printed Sep. 11, 2015.
Stefanov et al.,"The Smart House for Older Persons and Persons with Physical Disabilities: Structure, Technology Arrangements, and Perspectives," IEEE Transactions on Neural Systems and Rehabilitation Engineering, vol. 12, No. 2, pp. 228-250, Jun. 2004.
The International Search Report and Written Opinion for PCT application Serial No. PCT/US2016/056654, dated Dec. 15, 2016.
PCT/US2016/056654 Written Opinion dated Apr. 17, 2018.
EP Office Action dated Apr. 26, 2019, pp. 7.

\* cited by examiner

GESTURE CONTROL OF BUILDING AUTOMATION SYSTEM COMPONENTS DURING INSTALLATION AND/OR MAINTENANCE

TECHNICAL FIELD

The disclosure relates generally to building automation systems, and more particularly to installation and/or maintenance of building automation systems.

BACKGROUND

A variety of building automation systems, such as HVAC systems, lighting systems, security systems, fire suppression systems, energy management systems and the like, often include components that need to be configured and/or maintained. Some components need to be configured upon initial installation or upon replacement of an originally installed component. Sometimes, adding or changing other equipment may necessitate configuring an already installed and configured component. Some configurable components, such as but not limited to air handling boxes, are disposed in difficult to reach locations such as in ceilings, behind walls and the like. In some cases, a portable device such as a laptop computer can be used to communicate with and/or control the configurable component during installation and/or maintenance. Unfortunately, this typically requires the technician to operate the laptop computer, which can be difficult if, for example, the installer is on a ladder and is attempting to make manual adjustments on the configurable component. A better way of configuring such configurable components would be desirable.

SUMMARY

The disclosure relates generally to building automation systems, and more particularly to installation and/or maintenance of building automation systems. The disclosure contemplates using a wearable device to detect gestures of a technician, which can then be used to communicate and/or control a building automation system during installation and/or maintenance. This may free the technician from having to operate a lap top or the like to control the building automation system.

In an HVAC example, a technician can configure one or more HVAC components of an HVAC system using a wearable device and a mobile device that is operatively coupled to the wearable device. While not so limited, the wearable device may be a smart watch and the mobile device may be a smart phone. The mobile device may be configured to store a correspondence between each of one or more defined gestures detected by the wearable device and one or more corresponding HVAC component commands. The one or more HVAC component commands effect a desired change in the operation of one or more of the HVAC components of the HVAC system. A gesture sensed by the wearable device may be received at the mobile device, which then may determine if the received gesture corresponds to one of the defined gestures stored in the mobile device. If so, confirmation may be sent to the wearable device that the received gesture was recognized by the mobile device as corresponding to one of the defined gestures stored in the mobile device. The correspondence between each of one or more defined gestures and the one or more corresponding HVAC component commands stored in the mobile device may be used to identify the one or more HVAC component commands that correspond to the received gesture. The one or more HVAC component commands that are identified as corresponding to the received gesture may be transmitted to effect a change in the operation of one or more of the HVAC components of the HVAC system.

The preceding summary is provided to facilitate an understanding of some of the features of the present disclosure and is not intended to be a full description. A full appreciation of the disclosure can be gained by taking the entire specification, claims, drawings, and abstract as a whole.

BRIEF DESCRIPTION OF THE DRAWINGS

The disclosure may be more completely understood in consideration of the following description of various illustrative embodiments of the disclosure in connection with the accompanying drawings, in which.

While the disclosure is amenable to various modifications and alternative forms, specifics thereof have been shown by way of example in the drawings and will be described in detail. It should be understood, however, that the intention is not to limit the disclosure to the particular illustrative embodiments described herein. On the contrary, the intention is to cover all modifications, equivalents, and alternatives falling within the spirit and scope of the disclosure.

DESCRIPTION

The following description should be read with reference to the drawings wherein like reference numerals indicate like elements. The drawings, which are not necessarily to scale, are not intended to limit the scope of the disclosure. In some of the figures, elements not believed necessary to an understanding of relationships among illustrated components may have been omitted for clarity.

All numbers are herein assumed to be modified by the term "about", unless the content clearly dictates otherwise. The recitation of numerical ranges by endpoints includes all numbers subsumed within that range (e.g., 1 to 5 includes 1, 1.5, 2, 2.75, 3, 3.80, 4, and 5).

As used in this specification and the appended claims, the singular forms "a", "an", and "the" include the plural referents unless the content clearly dictates otherwise. As used in this specification and the appended claims, the term "or" is generally employed in its sense including "and/or" unless the content clearly dictates otherwise.

Devices or programs that are in communication with one another need not be in continuous communication with each other unless expressly specified otherwise. In addition, devices or programs that are in communication with one another may communicate directly or indirectly through one or more intermediaries.

As used herein, the terms "comprises," "comprising," "includes," "including," "has," "having" or any other variation thereof, are intended to cover a non-exclusive inclusion. For example, a process, method, article, system, or apparatus that comprises a list of features is not necessarily limited only to those features but may include other features not expressly listed or inherent to such process, method, article, system, or apparatus.

It is noted that references in the specification to "an embodiment", "some embodiments", "other embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is contemplated that the feature, structure, or characteristic may be applied to other embodiments whether or not explicitly described unless clearly stated to the contrary.

The present disclosure is directed generally at building automation systems. Building automation systems are systems that control one or more operations of a building. Building automation systems can include HVAC systems, security systems, lighting systems, fire suppression systems, energy management systems and/or any other suitable systems. While HVAC systems are used as an example below, it should be recognized that the concepts disclosed herein can be applied to building automation systems more generally.

A building automation system may include a controller, computer and/or other processing equipment that is configured to control one or more features, functions, systems or sub-systems of a building. In some cases, devices can be used by individuals to communicate with the controller, computer and/or other processing equipment. In some cases, a building automation system may include a plurality of components that, in combination, perform or otherwise provide the functionality of the building automation system. A building automation system may be fully contained within a single building, or may include components that are spread between multiple locations. For example, in some building automation system, the building to be controlled may include some of the components (e.g. air handling unit, boiler, furnace, dampers, local building control module, etc.), while other building automation system components may be located off-site (e.g. building automation server). In some embodiments, a building automation system, regardless of the physical location(s) of the components, may control one or more building systems within a single building. In some cases, a building automation system, regardless of the physical location(s) of the components, may control one or more building systems within a plurality of buildings, optionally in accordance with a common operating procedure and/or distinct operating procedures for each building as desired.

In some cases, a building automation system such as an HVAC system may include components that need to be configured upon initial installation, subsequent replacement and/or during routine maintenance. One illustrative but non-limiting example is an HVAC system that includes a variable volume (VAV) box. The VAV box may include a damper movable between a first damper position and a second damper position, and an HVAC controller that is mounted remotely from the VAV box. In some instances, the HVAC controller may be configured to control the VAV box in accordance with a temperature (or other) set point. Other set points may include, for example, a humidity set point, a $CO_2$ set point (max $CO_2$ content), an air quality set point, a ventilation set point (e.g. min ventilation), and/or any other suitable set point as desired.

Figure 1:
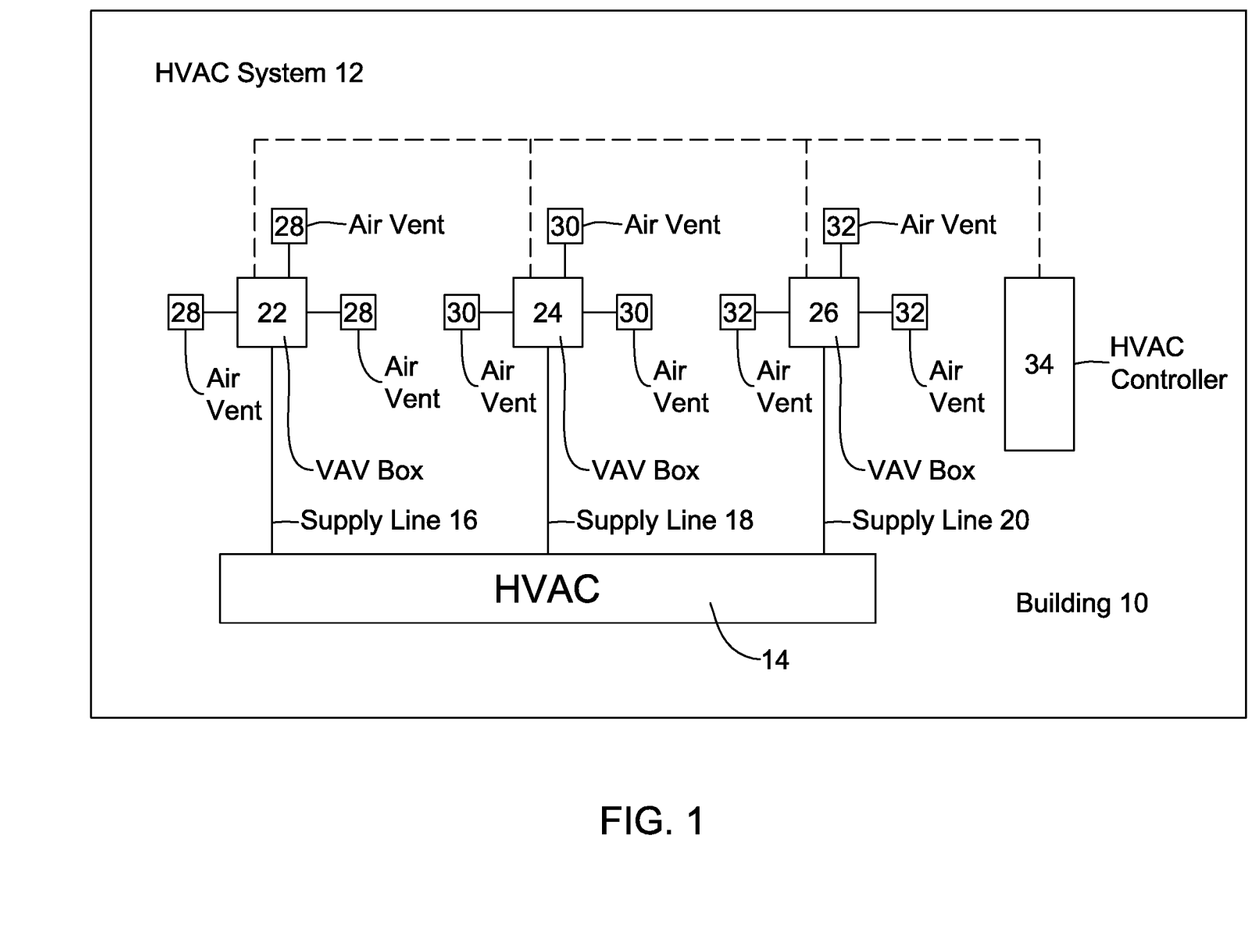
FIG. 1 is a schematic view of an illustrative HVAC system.

FIG. 1 is a schematic view of a building 10 that includes an HVAC system 12. In some instances, the building 10 may represent a house and may have a single HVAC system 12 within the building 10. In some cases, the building 10 may represent a larger structure such as an office building, a shopping center, a library, and the like, and the building 10 may include two or more distinct HVAC systems 12, as appropriate given the size and layout of the building 10. In some embodiments, as illustrated, the HVAC system 12 may be a forced air system and may include a conditioned air source 14. The conditioned air source 14 may provide, for example, cooling air, heating air, and/or ventilation air. In some cases, the conditioned air source 14 may provide conditioned air at a constant temperature, and temperature control within the building 10 may be achieved by regulating the relative amounts of conditioned air and outside air, or the relative amounts of conditioned air and recirculated air, that are provided to a room or zone in the building 10.

In the example shown, the conditioned air source 14 is fluidly coupled with a first supply line 16, a second supply line 18 and a third supply line 20. It will be appreciated that this is merely illustrative, as the conditioned air source 14 may be fluidly coupled with just one or two supply lines, or a larger number of supply lines depending on the application. In FIG. 1, the first supply line 16 extends to and is fluidly coupled with a first VAV box 22. The second supply line 18 extends to and is fluidly coupled with a second VAV box 24. The third supply line 20 extends to and is fluidly coupled with a third VAV box 26. Again, the number of VAV boxes shown is merely illustrative. Each of the first VAV box 22, the second VAV box 24 and the third VAV box 26 may include a moveable internal damper that can be actuated between a closed position and an open position, and in some cases may be actuatable to any intermediate position between the closed position and the open position. As a result, each VAV box can control how much of the conditioned air received by the VAV box is permitted to continue downstream of the VAV box and into a corresponding room or zone of the building.

In some cases, each VAV box may be fluidly coupled to one, two, three or more air vents that distribute conditioned air that passes through a particular VAV box to a particular room, zone or zones within a building such as building 10. In the example shown in FIG. 1, the first VAV box 22 is fluidly coupled to a total of three air vents 28, the second VAV box 24 is fluidly coupled to a total of three air vents 30, and the third VAV box 26 is fluidly coupled to a total of three air vents 32. It will be appreciated that having three air vents fluidly coupled to each VAV box is merely illustrative. In some embodiments, a particular VAV box will provide conditioned air to a particular space, such as a room, and thus will feed a particular number of air vents as dictated by the spatial arrangement of the space or room.

In some instances, the HVAC system 12 may include an HVAC Controller 34 that is operably coupled to the conditioned air source 14, the first VAV box 22, the second VAV box 24 and the third VAV box 26. In some cases, for example, the HVAC Controller 34 may monitor an ambient temperature (or other environmental condition such as humidity, $CO_2$ level, air quality, etc.) within the building 10 and may provide instructions to the conditioned air source 14 and/or to one or more of the first VAV box 22, the second VAV box 24 and the third VAV box 26 as appropriate to alter the temperature (or other environmental condition) within the building 10. In some cases, a single HVAC Controller 34 may control the entire HVAC system 12 for the entire building 12. In some instances, the HVAC Controller 34 may be considered as representing two or more distinct HVAC Controllers, each controlling a particular space or zone within the building 10, and optionally in communication with each other.

In some cases, the HVAC Controller 34 may be programmed with a temperature set point setback program that enables the building 10 to operate at a more energy efficient temperature at certain times of day and/or particular days, such as when the occupants of the building 10 are away from the building 10, or perhaps are within the building 10 but are sleeping. In some cases, the HVAC Controller 34 is not programmable, and merely maintains a desired temperature set point. In some cases, as will be discussed, the HVAC Controller 34 may be configured to enable an installer or other professional to test and calibrate the HVAC system 12 upon initial installation and/or periodically as desired.

In FIG. 1, the HVAC system 12 is schematically illustrated as having supply lines 16, 18 and 20 extending from the conditioned air source 14 to the VAV boxes 22, 24 and 26. In some cases, the HVAC system 12 may be a single deck system in which a single air duct provides conditioned air at a constant or substantially constant temperature to the VAV box to which it is fluidly coupled. In most cases, one or more return ducts (not shown) may return air from the various rooms to the conditioned air source 14. The VAV box may be controlled to vary the amount of conditioned air exiting the VAV box. In some cases, the VAV box may include a local heat source that can be used to increase the temperature of the air exiting the VAV box. In some cases, the HVAC system 12 may be a dual deck system, in which a first air duct provides conditioned cool air and a second air duct provides conditioned warm air to the VAV box to which the air ducts are fluidly coupled.

In some cases, a VAV box may be calibrated via a procedure known as a test and balance procedure. In a test and balance procedure, an installer determines actual air flow for a particular VAV box at various damper positions. During a test and balance procedure, an installer can instruct via the HVAC Controller 34 a damper in a VAV box to move to a particular damper position, and then resulting air flow may be measured either manually by the installer or automatically if the VAV box has an appropriate flow sensor. Accordingly, determinations may be made regarding appropriate damper positions for various desired air flow values, and the VAV box may be so calibrated. It will be appreciated that air flow is determined in order to achieve desired temperature, humidity and/or other environmental conditions in the space.

In some cases, a test and balance procedure may include instructing a particular damper to drive to a first damper position to obtaining a measure of air flow with the damper at the first damper position. The test and balance procedure may also include instructing the damper to drive to a second damper position to obtaining a measure of air flow with the damper at the second damper position. In some instances, the first damper position represents a minimum damper open position and the second damper position represents a maximum damper open position, although this is not required. In some cases, the test and balance procedure may include instructing a damper to drive to a plurality of different intermediate damper positions, and obtaining air flow measurements for each of those damper positions. In some cases, a damper is driven to a particular position, and the damper is held at that position. An indication of airflow may be obtained (either manually by the installer or automatically via the VAV box if so equipped), and the damper may be released from the particular position. It will be appreciated that in some cases, dampers may be biased to a particular position such as a fully open or a fully or partially closed position. In some cases, other parameters such as humidity and/or carbon dioxide concentration may also be measured.

Figure 2:
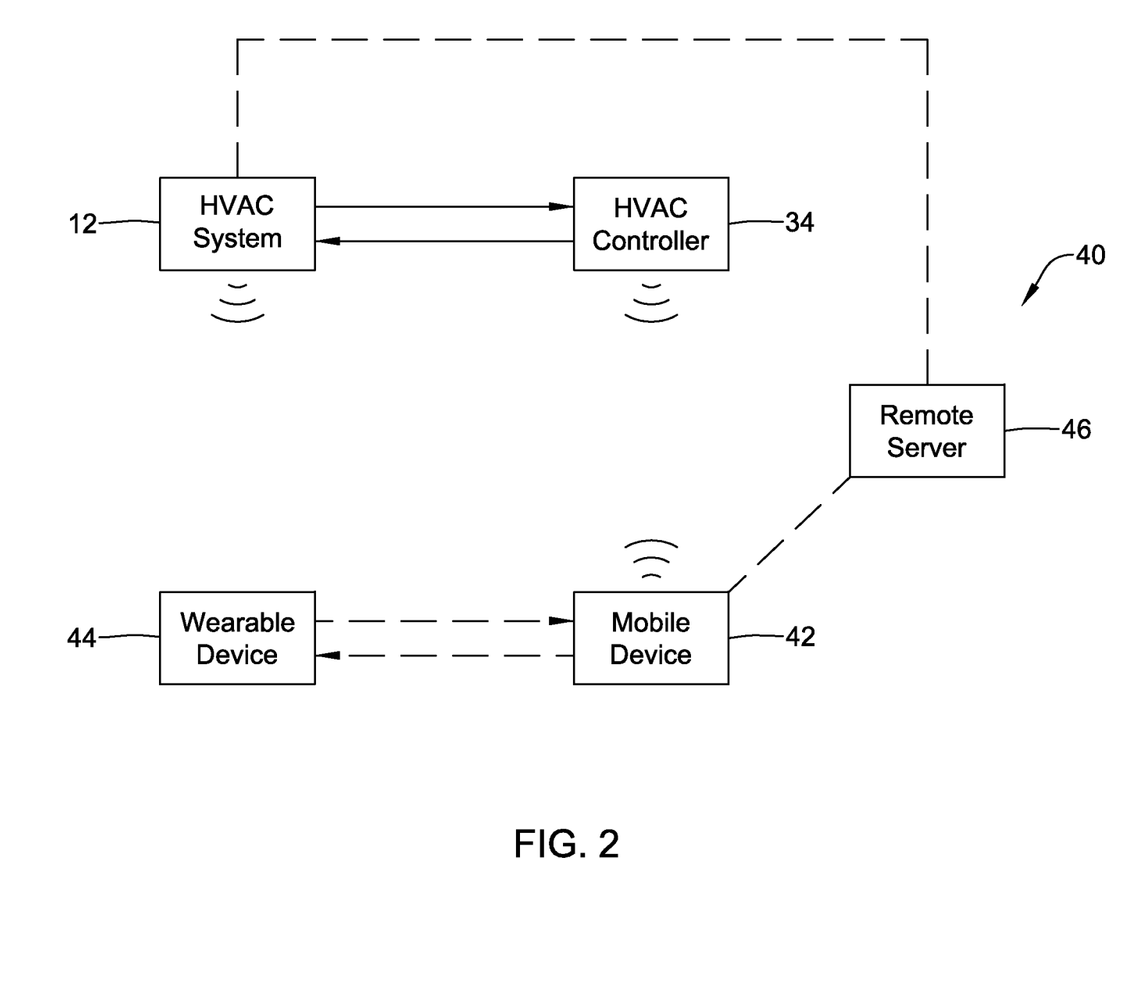
FIG. 2 is a schematic view of an HVAC system in accordance with an illustrative embodiment of the disclosure.

FIG. 2 is a schematic view of an illustrative system 40, which shows the illustrative HVAC system 12 and the illustrative HVAC Controller 34. In the example shown, the system 40 further includes a mobile device 42 that in some cases may be used for configuring one or more individual components of the HVAC system 12. In some instances, for example, the mobile device 42 may be used in conducting a test and balance procedure on one or more VAV boxes that may be part of the HVAC system 12. In some cases, it will be appreciated that the mobile device 42 may be, for example, a laptop computer, a tablet or a smartphone, which is configured to execute a program that enables the mobile device 42 to control one or more individual components of the HVAC system 12. The example system 40 may further include a wearable device 44 that communicates with the mobile device 42.

In some cases, the wearable device 44 may be configured to recognize movement. In some cases, the wearable device 44 may include an accelerometer, gyroscope and/or other sensor or sensors that can detect movement of the wearable device 44. In some cases, the wearable device 44 may be configured to be worn on a wrist, such as a smart watch or a bracelet such as an activity-monitoring bracelet. In some instances, the wearable device 44 may be a ring. In some cases, the wearable device 44 may be a smart watch, but this is not required. In some instances, the wearable device 44 itself may be configured to learn and subsequently recognize one or more gestures based on detected movements of the wearable device 44. In other instances, the wearable device 44 transmits movement data to the mobile device 42, and the mobile device is configured to learn and/or recognize one or more gestures based on the detected movements. In yet other instances, the wearable device 44 transmits movement data to the mobile device 42, which then transmits the movement data to a remote server or the like, and the remote server is configured to learn and/or recognize one or more gestures based on the detected movements.

It will be appreciated, particularly if the mobile device 42 is configured to learn and/or recognize one or more gestures based on the detected movements, that once the mobile device 42 has learned the gestures associated with particular HVAC component commands, and the installer has initiated the configuration program running on the mobile device 42, the installer can simply place the mobile device 42 in their pocket. Then, the installer can control the HVAC system 12 in a hands-free manner simply by performing various gestures via the wearable device 44, which are then recognized by the mobile device 42. The mobile device 42 may send corresponding commands to the HVAC controller 34.

In one example, the wearable device 44 may be disposed on an individual's hand or wrist. The wearable device 44 and/or the mobile device 42 can be taught one or more gestures that include the individual moving their hand, wrist and/or arm. To illustrate, the wearable device 44 moving in a clockwise circle may be a first gesture, and the wearable device 44 moving in a counter-clockwise circle may be a second gesture. It will be appreciated that there can be any number of different gestures that can be taught to the wearable device 44 and/or mobile device 42.

In some cases, the wearable device 44 itself remembers the learned gestures, and then processes detected motion to see if any movement represents a learned gesture. In other instances, the mobile device 42 may remember any learned gestures, and may process detected motion reported by the wearable device 44. In some cases, the wearable device 44 may communicate with the mobile device 42 using a wireless communications protocol, such as but not limited to, any combination or portion of, IEEE 802.15-based wireless communication, Zigbee communication, INSTEON communication, X10 communication protocol, Z-Wave communication, Bluetooth communication, WIFI communication, IEEE 802.11-based communication, WiMAX communication, IEEE 802.16-based communication, cellular, various proprietary wireless communications, or any combination thereof.

In some cases, the wearable device 44 may report detected motion to the mobile device 42 by transmitting data indicating one or more of a net change in position in the X direction, a net change in position in the Y direction and a net change in position in the Z direction over time, where the X direction, the Y direction and the Z direction are mutually orthogonal axes. In some cases, the data may include or otherwise represent ordered triplets over time, reporting net change in position (which can be zero or non-zero) for each of the X direction, the Y direction and the Z direction. In some cases, alternatively, data representing a gesture may include a vector expressed in magnitude and direction representing movement detected relative to an initial orientation of the wearable device 44. These are just some examples.

It will be appreciated that once one or more gestures have been learned by the system 40, an individual such as an installer may utilize the learned gestures to provide commands or other instructions to the mobile device 42, which may in turn provide instructions to the HVAC system 12. In some cases, the mobile device 42 may communicate directly with the HVAC system 12. In some instances, the mobile device 42 may instead communicate with a remote server 46, which in turn may relay instructions to the HVAC system 12. In some cases, the wearable device 44 may provide instructions directly to the HVAC system 12, eliminating the need for the mobile device 42.

Figure 3:
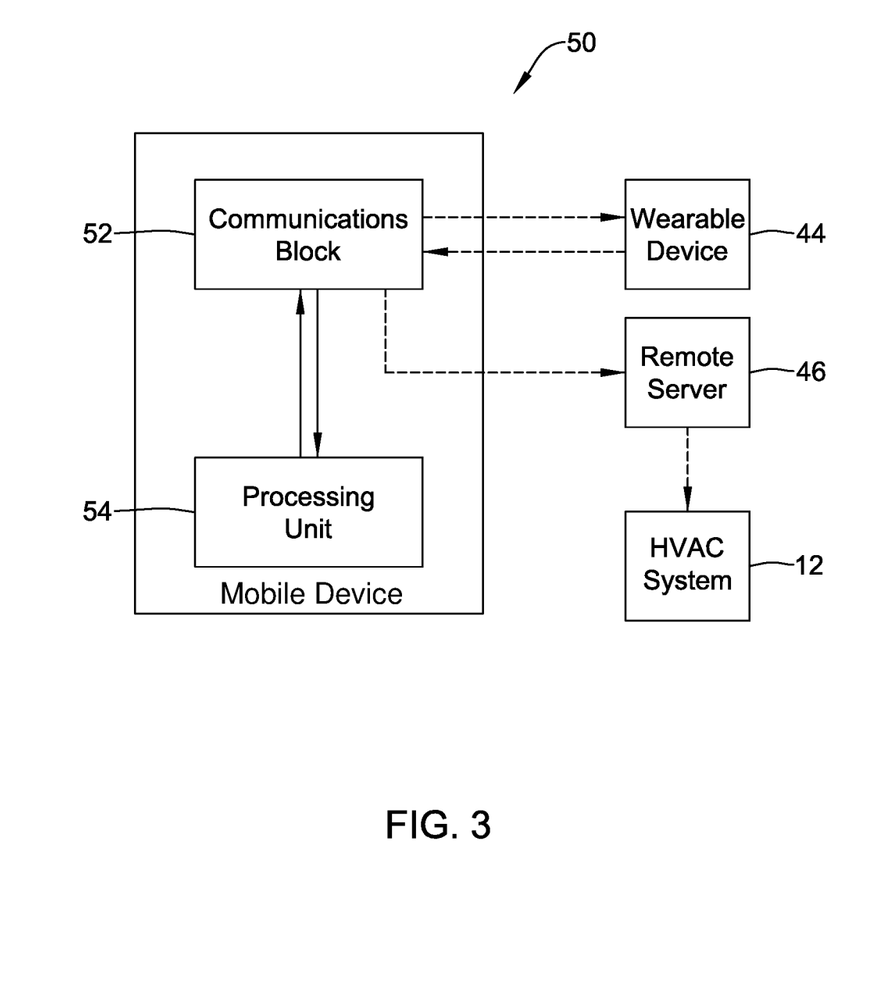
FIG. 3 is a schematic view of an illustrative mobile device useful in configuring the HVAC systems of FIGS. 1 and 2.

FIG. 3 is a schematic illustration of an illustrative mobile device 50 that may be used by a contractor in configuring one or more components of the HVAC system 12. In some cases, the mobile device 50 may be operably couplable to the wearable device 44 such that the contractor can utilize the wearable device 44 to learn and then capture gestures made by the contractor (and thus the wearable device 44) in order to carry out particular instructions by, for example, the mobile device 50. It will be appreciated that the mobile device 50 represents an embodiment of the mobile device 42 (FIG. 2). In the example shown, the mobile device 50 may include a communications block 52 and a processing unit 54 that is operably coupled to the communications block 52. The processing unit 54 may be configured to receiving a gesture sensed by the wearable device 44 via the communications block 52, and to determine if the gesture received via the communications block 52 corresponds to one of a plurality of defined (e.g. learned) gestures. If the received gesture does correspond to one of a plurality of defined gestures, the processing unit 54 may be configured to identify a corresponding command and transmit the corresponding command via the communications block 52 to an HVAC Controller to effect a desired change in the operation of one or more of the HVAC components of the HVAC system 12. In some cases, the indication of the defined gesture that corresponds to the received gesture may be transmitted from the mobile device 50 to a remote server 46, which may identify a corresponding command and send a corresponding command to an HVAC controller to effect a desired change in the operation of one or more of the HVAC components of the HVAC system 12.

Figure 4:
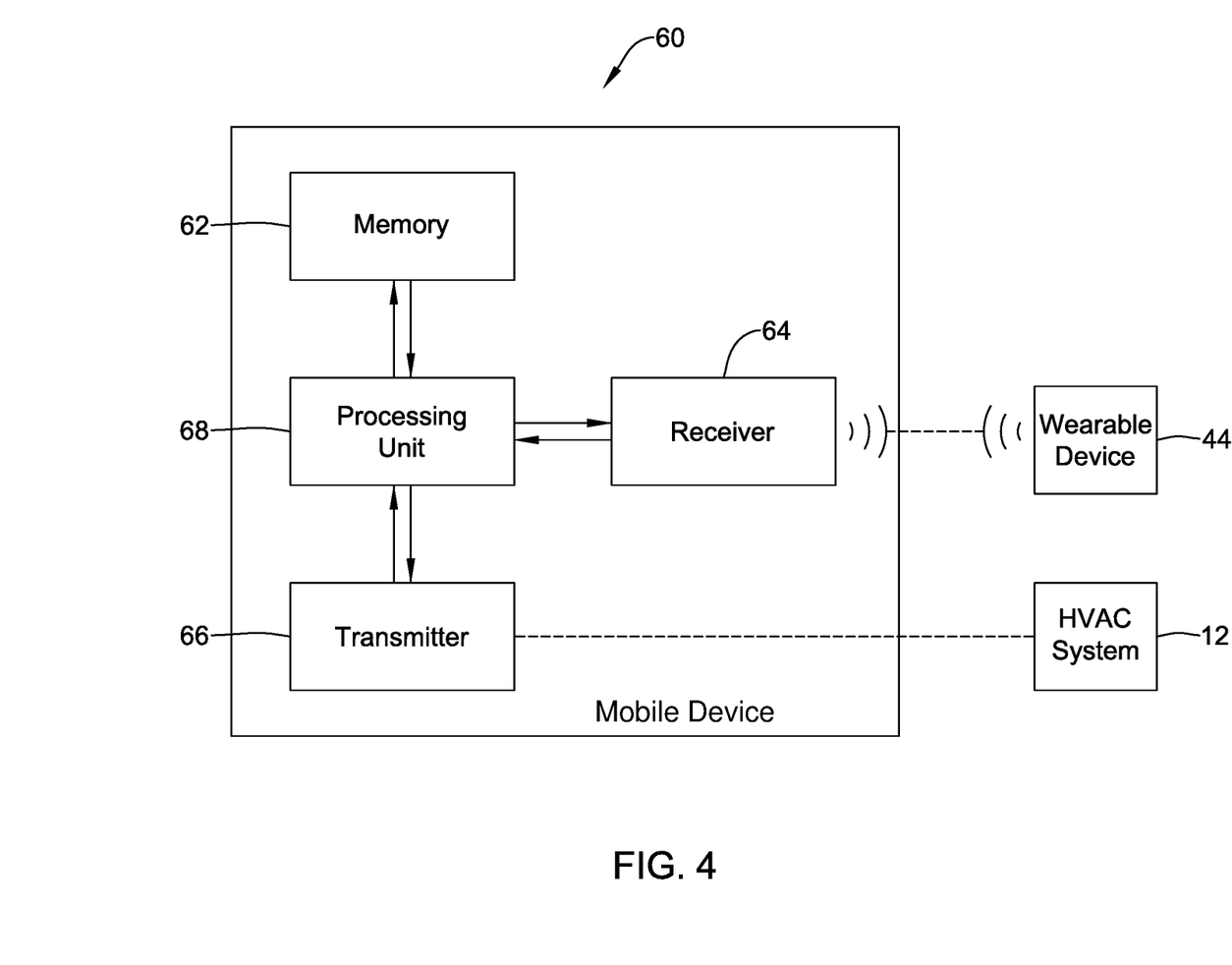
FIG. 4 is a schematic view of an illustrative mobile device useful in configuring the HVAC systems of FIGS. 1 and 2.

FIG. 4 is a schematic illustration of another illustrative mobile device 60 that may be used by a contractor in configuring one or more components of the HVAC system 12. In some cases, the mobile device 60 may be operably couplable to a wearable device 44 such that the contractor can utilize the wearable device 44 to learn and then capture gestures made by the contractor (and thus the wearable device 44) in order to carry out particular instructions by the mobile device 60. It will be appreciated that the mobile device 60 may represent an embodiment of the mobile device 42 (FIG. 2). The illustrative mobile device 60 may include a memory 62 for storing a correspondence between each of one or more defined gestures and one or more corresponding HVAC component commands, wherein the one or more HVAC component commands when executed effect a change in the operation of one or more of the HVAC components of the HVAC system 12. A receiver 64 may be configured to receive a gesture sensed by the wearable device 44. A transmitter 66 may be configured to communicate directly or indirectly with the HVAC system 12. A processing unit 68 may be operatively coupled to the memory 62, the receiver 64 and the transmitter 66 and may be configured to determine if the gesture received via the receiver 64 corresponds to one of the defined gestures stored in the memory 62 of the mobile device 60. If it does, the processing unit 68 is configured to identify the one or more HVAC component commands that correspond to the received gesture using the correspondence between each of one or more defined gestures and the one or more corresponding HVAC component commands stored in the memory. The processing unit 68 may also transmits via the transmitter 66 the one or more HVAC component commands identified as corresponding to the received gesture to effect a change in the operation of one or more of the HVAC components of the HVAC system 12. In some cases, the processing unit 68 of the mobile device 60 is further configured to transmit a confirmation to the wearable device 44 that the received gesture was recognized by the mobile device 60 as corresponding to one of the defined gestures stored in the mobile device 60.

Figure 5:
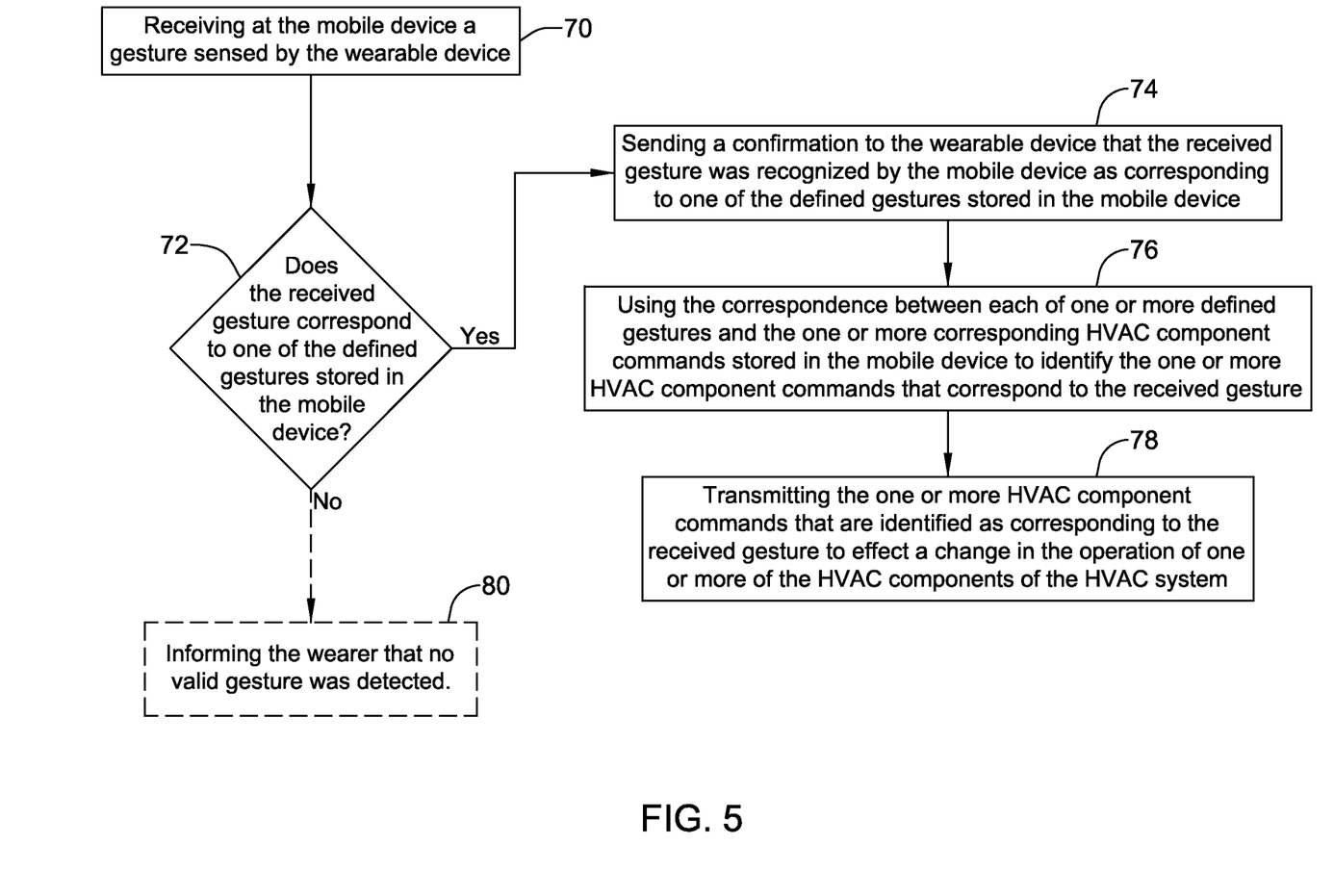
FIG. 5 is a flow diagram showing an illustrative method in accordance with an embodiment of the disclosure.

FIG. 5 is a flow diagram showing an illustrative method by which a contractor may configure one or more HVAC components of an HVAC system (such as the HVAC system 12) using a wearable device (such as the wearable device 44) and a mobile device (such as the mobile device 42, 50, 60). In some instances, the wearable device is a smartwatch and the mobile device is a smartphone, but this is not required. In some cases, the mobile device stores a correspondence between each of one or more defined gestures and one or more corresponding HVAC component commands, wherein the one or more HVAC component commands, when executed by an HVAC controller, effect a change in the operation of one or more of the HVAC components of the HVAC system. A gesture sensed by the wearable device may be received at the mobile device, as generally indicated at block 70. At decision block 72, a determination is made whether the received gesture corresponds to one of the defined gestures stored in the mobile device.

If yes, control passes to block 74, where a confirmation is sent to the wearable device that the received gesture was recognized by the mobile device as corresponding to one of the defined gestures stored in the mobile device. In some cases, a detectable signal may be provided to the wearer of the wearable device, informing the wearer that the received gesture was recognized by the mobile device as corresponding to one of the defined gestures stored in the mobile device. The detectable signal may, for example, be provided by the wearable device or by the mobile device. In some cases, the detectable signal may be provided by both the wearable device and the mobile device. In some instances, the detectable signal may be an audible signal such as, but not limited to, a tone, a beep, a buzz, a spoken word, phrase or sentence or a song. In some cases, the detectable signal may be a visually perceptible signal such as, but not limited to, a flash or series of flashed from a light source, a description displayed on a display or an icon displayed on a display. In some cases, the detectable signal may include a vibration signal. sometimes, the detectable signal may include two or more of an audible signal, a visually perceptible signal and a vibration signal. Optionally, the detectable signal provides an indication of which of the defined gestures stored in the mobile device was identified as corresponding to received gesture.

At block 76, the correspondence between each of one or more defined gestures and the one or more corresponding HVAC component commands stored in the mobile device may be used to identify the one or more HVAC component commands that correspond to the received gesture. The one or more HVAC component commands that are identified as corresponding to the received gesture may be transmitted to effect a change in the operation of one or more of the HVAC components of the HVAC system, as generally indicated at block 78.

Returning briefly to decision block 72, if the received gesture does not correspond to one of the defined gestures that are stored in the mobile device, control may pass to block 80, where the wearer of the wearable device may be informed that no valid gesture was detected. This may be an alphanumeric message displayed on the wearable device, or perhaps a particular tone may be generated. In some cases, the wearer may be informed that no valid gesture was detected by not providing any feedback. In some instances, a lack of detectable signal may inform the wearer that the gesture was not correctly captured, and so the wearer will know to try again.

In some cases, a message may be sent to the wearable device that indicates that the received gesture did not correspond to one of the defined gestures that are stored in the mobile device. The wearable device and/or mobile device may notify the user that the received gesture did not correspond to one of the defined gestures using any of the detectable signals discussed above.

It will be appreciated that a variety of wireless communication protocols may be used to communicate between the wearable device the mobile device and/or between the mobile device and an HVAC controller. Such wireless communication protocols may include, but are not limited to, any combination or portion of, IEEE 802.15-based wireless communication, Zigbee communication, INSTEON communication, X10 communication protocol, Z-Wave communication, Bluetooth communication, WIFI communication, IEEE 802.11-based communication, WiMAX communication, IEEE 802.16-based communication, cellular, various proprietary wireless communications, or any combination thereof. In some cases, for example, the gesture sensed by the wearable device is received at the mobile device via bluetooth communication and the one or more HVAC component commands that are identified as corresponding to the received gesture are transmitted via bluetooth. In some cases, the gesture sensed by the wearable device is received at the mobile device via bluetooth communication and the one or more HVAC component commands that are identified as corresponding to the received gesture are transmitted via Wifi. In some instances, the gesture sensed by the wearable device is received at the mobile device via Wifi communication and the one or more HVAC component commands that are identified as corresponding to the received gesture are transmitted via Wifi. These are just some examples.

Figure 6:
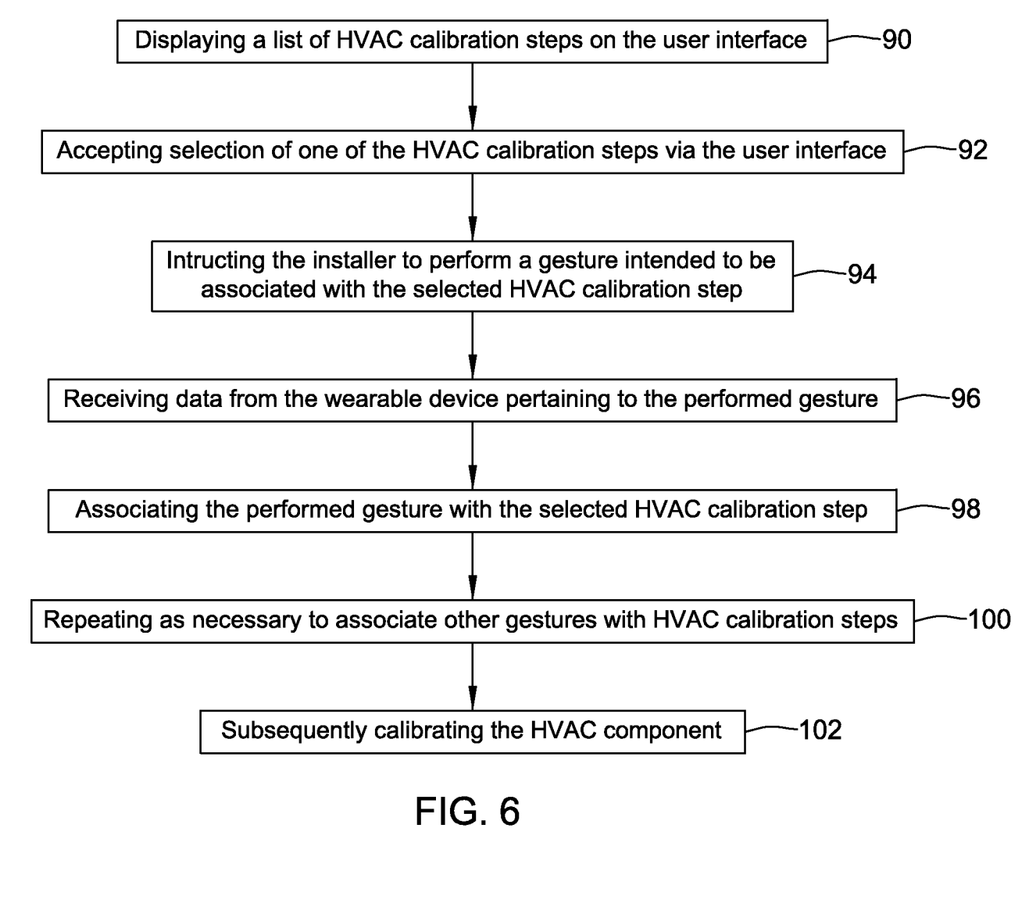
FIG. 6 is a flow diagram showing an illustrative method in accordance with an embodiment of the disclosure.

FIG. 6 is a flow diagram showing an illustrative method by which a contractor may configure one or more HVAC components of an HVAC system (such as the HVAC system 12) using a smartwatch (such as the wearable device 44) and a mobile device (such as the mobile device 42, 50, 60). The mobile device may have a user interface, and may be configured to receive installer gestures that are captured by the smartwatch. The mobile device may further store a listing of HVAC calibration steps and one or more corresponding previously defined gestures.

In FIG. 6, the mobile device first learns gestures that correspond to each of the HVAC calibration steps. The illustrative learning process begins at block 90, where a list of HVAC calibration steps are displayed on the user interface of the mobile device. At block 92, selection of one of the HVAC calibration steps is accepted via the user interface, and the installer is instructed via the user interface to perform a gesture intended to be associated with the selected HVAC calibration step, as generally shown at block 94. Data pertaining to the performed gesture is received at the mobile device from the smartwatch, as indicated at block 96. As seen at block 98, the performed gesture is then associated with the selected HVAC calibration step. As indicated at block 100, these steps are repeated as necessary to associate the other HVAC calibration steps with a corresponding unique gesture. After the learning process, a learned gesture may be made by the installer to automatically perform a corresponding HVAC calibration step, as generally seen at block 102. An example calibration step may be to open a damper of a particularly VAV box and turn on the HVAC blower. Another example calibration step may be to close the damper of the air handling box.

Figure 7:
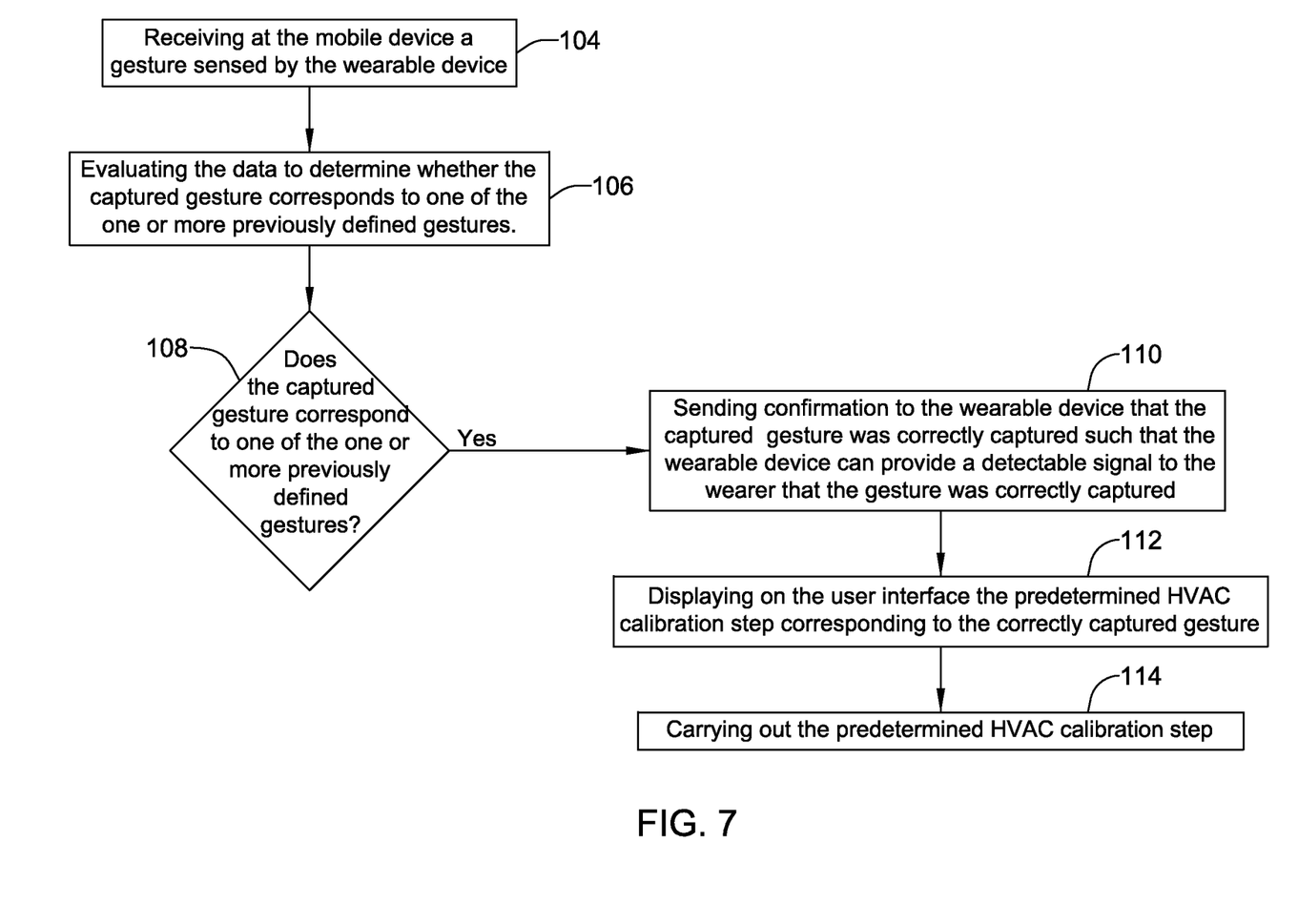
FIG. 7 is a flow diagram showing an illustrative method in accordance with an embodiment of the disclosure.

FIG. 7 is a flow diagram showing an illustrative method for actually calibrating an HVAC component, and may be considered a continuation of the flow diagram shown in FIG. 6. As seen at block 104, data may be received that pertains to a gesture captured by the smartwatch and may be evaluated, as indicated at block 106, to determine whether the captured gesture corresponds to one of the one or more previously defined gestures. At decision block 108, a determination is made. If the captured gesture corresponds to one of the one or more previously defined gestures, control passes to block 110, where confirmation is sent to the smartwatch that the captured gesture was correctly captured such that the smartwatch can provide a detectable signal to the wearer that the gesture was correctly captured. In response, and as indicated at block 112, the predetermined HVAC calibration step corresponding to the correctly captured gesture may be displayed on the user interface of the mobile device and/or smartwatch. The predetermined HVAC calibration step is then executed as seen at block 114.

In some cases, the HVAC component comprises an air handling box, and calibrating the HVAC component comprises performing a test and balance procedure on the air handling box. An example calibration step may be to open a damper of the air handling box and turn on the HVAC blower. Another example calibration step may be to close the damper of the air handling box.

The disclosure should not be considered limited to the particular examples described above. Various modifications, equivalent processes, as well as numerous structures to which the disclosure can be applicable will be readily apparent to those of skill in the art upon review of the instant specification.

What is claimed is:

1. A method for a contractor to configure a heating, ventilation and cooling (HVAC) component during initial installation and/or maintenance of a forced air HVAC system using a wearable device and a mobile device that is operatively coupled to the wearable device, the method comprising:
   storing in the mobile device two or more different HVAC component configuration commands for use in configuring the HVAC component by the contractor during initial installation and/or maintenance of the forced air HVAC system, one of the two or more different HVAC component configuration commands including an open damper command for commanding a damper of the HVAC component of the forced air HVAC system to move in an open direction and another of the two or more different HVAC component configuration commands including a close damper command for commanding the damper to move in a close direction;
   storing in the mobile device a defined gesture for each of the two or more HVAC component configuration commands;
   receiving at the mobile device a gesture of the contractor sensed by the wearable device;
   determining if the received gesture is one of the defined gestures stored in the mobile device that corresponds to one of the one or more HVAC component configuration commands stored in the mobile device;
   if the received gesture does not correspond to any of the defined gestures stored in the mobile device that correspond to one of the one or more HVAC component configuration commands stored in the mobile device, sending a message to the wearable device indicating that the received gesture did not correspond to any of the defined gestures stored in the mobile device that correspond to one of the one or more HVAC component configuration commands stored in the mobile device;
   if the received gesture corresponds to one of the defined gestures stored in the mobile device that corresponds to one of the one or more HVAC component configuration commands stored in the mobile device:
      sending a confirmation to the wearable device that the received gesture was recognized by the mobile device as corresponding to one of the defined gestures stored in the mobile device that corresponds to one of the one or more HVAC component configuration commands stored in the mobile device;
      transmitting the HVAC component configuration command that corresponds to the received gesture to effect a change in the operation of the HVAC component of the forced air HVAC system to aid the contractor in configuring the HVAC component of the forced air HVAC system.

2. The method of claim 1, wherein in response to receiving the confirmation at the wearable device, providing a detectable signal to the wearer of the wearable device that confirms the received gesture was recognized by the mobile device as corresponding to one of the defined gestures stored in the mobile device.

3. The method of claim 2, wherein the detectable signal is provided by the wearable device, by the mobile device or by both the wearable device and the mobile device.

4. The method of claim 2, wherein the detectable signal includes an audible signal and/or a visually perceptible signal.

5. The method of claim 4, wherein the audible signal comprises one or more of:
   a tone;
   a beep;
   a buzz;
   a spoken word, phrase or sentence; and
   a song.

6. The method of claim 4, wherein the visually perceptible signal comprises one or more of:
   a flash or series of flashed from a light source;
   a description displayed on a display; and
   an icon displayed on a display.

7. The method of claim 2, wherein the detectable signal includes a vibration signal.

8. The method of claim 2, wherein the detectable signal includes two or more of an audible signal, a visually perceptible signal and a vibration signal.

9. The method of claim 2, wherein the detectable signal comprises an indication of which of the defined gestures stored in the mobile device was identified as corresponding to the received gesture.

10. The method of claim 1, wherein the two or more HVAC component configuration commands provide part of a test and balance procedure used by the contractor for calibrating the forced air HVAC system.

11. The method of claim 1, wherein the two or more HVAC component configuration commands further comprise an HVAC component configuration command that instructs the damper to drive to an intermediate position between a fully open position and a fully closed position as part of calibrating a Variable Air Volume (VAV) box.

12. The method of claim 1, wherein the mobile device comprises a learning mode for allowing a user to teach the mobile device one or more of the defined gestures, such that at least one of the one or more defined gestures is a learned gesture.

13. The method of claim 1 wherein:
   the gesture sensed by the wearable device is received at the mobile device via bluetooth communication; and
   the HVAC component configuration command that is identified as corresponding to the received gesture is transmitted via bluetooth.

14. The method of claim 1 wherein:
   the gesture sensed by the wearable device is received at the mobile device via bluetooth communication; and
   the HVAC component configuration command that is identified as corresponding to the received gesture is transmitted via WiFi.

15. The method of claim 1 wherein:
   the gesture sensed by the wearable device is received at the mobile device via WiFi communication; and
   the one or more HVAC component configuration command that is identified as corresponding to the received gesture is transmitted via WiFi.

16. The method of claim 1 wherein the mobile device is a smartphone and the wearable device is a smart watch.

* * * * *